(12) United States Patent
Zhou et al.

(10) Patent No.: US 10,818,009 B2
(45) Date of Patent: Oct. 27, 2020

(54) SYSTEM AND METHOD FOR IMAGE RECONSTRUCTION

(71) Applicant: SHANGHAI UNITED IMAGING HEALTHCARE CO., LTD., Shanghai (CN)

(72) Inventors: Xin Zhou, Shanghai (CN); Yanli Song, Shanghai (CN); Qiang Li, Shanghai (CN); Guobin Li, Shanghai (CN); Chaohong Wang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 127 days.

(21) Appl. No.: 16/024,852

(22) Filed: Jun. 30, 2018

(65) Prior Publication Data

US 2019/0147589 A1 May 16, 2019

Related U.S. Application Data

(63) Continuation of application No. PCT/CN2017/100292, filed on Nov. 10, 2017.

(51) Int. Cl.
*G06T 7/00* (2017.01)
*G06T 5/50* (2006.01)
*G06T 5/00* (2006.01)
*G06K 9/62* (2006.01)

(52) U.S. Cl.
CPC .......... *G06T 7/0012* (2013.01); *G06K 9/6268* (2013.01); *G06K 9/6292* (2013.01); *G06T 5/003* (2013.01); *G06T 5/50* (2013.01); *G06T 2207/10088* (2013.01); *G06T 2207/20056* (2013.01); *G06T 2207/20064* (2013.01); *G06T 2207/20081* (2013.01); *G06T 2207/20221* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 9,805,481 | B2* | 10/2017 | Sperl | G06T 11/005 |
| 10,573,031 | B2* | 2/2020 | Mailhe | G06T 11/005 |
| 2006/0239336 | A1* | 10/2006 | Baraniuk | H04L 25/20 375/216 |
| 2011/0058719 | A1* | 3/2011 | Trzasko | G06T 11/006 382/131 |
| 2011/0142316 | A1* | 6/2011 | Wang | G06T 11/006 382/131 |

(Continued)

*Primary Examiner* — Delomia L Gilliard
(74) *Attorney, Agent, or Firm* — Metis IP LLC

(57) ABSTRACT

A method and a system for image reconstruction are provided. The method may include acquiring raw image data, wherein the raw image data may include a plurality of frequency domain undersampled image data samples. The method may include generating a first reconstruction result based on the raw image data using a first reconstruction method, and generating a second reconstruction result based on the raw image data using a second reconstruction method. The method may further include fusing the first reconstruction result and the second reconstruction result, and generating a reconstructed image based on a result of the fusion.

20 Claims, 13 Drawing Sheets

(56) References Cited

U.S. PATENT DOCUMENTS

| | | | |
|---|---|---|---|
| 2012/0155730 A1* | 6/2012 | Metaxas | G01R 33/5608 382/131 |
| 2014/0219062 A1* | 8/2014 | Rothberg | B81B 3/0021 367/135 |
| 2015/0003708 A1* | 1/2015 | Prevrhal | G06T 11/008 382/131 |
| 2015/0170361 A1* | 6/2015 | Wang | A61B 6/5205 378/9 |
| 2017/0053402 A1* | 2/2017 | Migukin | G01R 33/5611 |
| 2017/0322276 A1* | 11/2017 | Bhat | G01R 33/4828 |
| 2018/0249979 A1* | 9/2018 | Wang | A61B 5/0035 |
| 2019/0172230 A1* | 6/2019 | Mailhe | G06N 3/08 |

* cited by examiner

SYSTEM AND METHOD FOR IMAGE RECONSTRUCTION

CROSS-REFERENCE OF RELATED APPLICATIONS

This application is a continuation of International Application No. PCT/CN2017/100292, filed on Nov. 10, 2017, which designates the United States of America, the contents of which are incorporated herein by reference.

TECHNICAL FIELD

The present disclosure generally relates to image reconstruction, and more particularly, to a system and method for generating a reconstructed image by fusing a plurality of image reconstruction results.

BACKGROUND

Image reconstruction is normally involved in medical imaging. Various reconstruction methods are known for generating reconstructed images from raw image data acquired during a medical imaging procedure and each reconstruction method may have its own advantages and disadvantages. For example, a compressive sensing (CS) method and a deep learning (DL) method may be used to generate a magnetic resonance imaging (MRI) image. When using the CS method, to achieve fast image reconstruction, the time spent on the MRI scan needs to be limited and data collected to reconstruct the MRI image may be undersampled. The undersampled data may result in inaccurate information in the reconstructed image. When using the DL method, a deep learning model has to be trained using a vast amount of training data to produce accurate information in the reconstructed image. However, the deep learning model is highly dependent on the training data and the trained deep learning model may only perform well with respect to a certain type of raw images. Therefore, it would be desirable to combine the compressive sensing method with the deep learning method to reconstruct medical images with more accurate information.

SUMMARY

According to one aspect of the present disclosure, a method is provided. The method may be implemented on at least one device including at least one processor and at least one computer-readable storage medium. The method may include one or more of the following operations. Raw image data may be acquired, wherein the raw image data may include a plurality of frequency domain undersampled image data samples. A first reconstruction result may be generated based on the raw image data using a first reconstruction method. A second reconstruction result may be generated based on the raw image data using a second reconstruction method. The first reconstruction result and the second reconstruction result may be fused. A reconstructed image may be generated based on a result of the fusion.

According to another aspect of the present disclosure, a system is provided. The system may include a storage device storing a set of instructions and at least one processor configured to communicate with the storage device. When executing the instructions, the at least one processor may cause the system to acquire raw image data, wherein the raw image data may include a plurality of frequency domain undersampled image data samples. When executing the instructions, the at least one processor may further cause the system to generate a first reconstruction result based on the raw image data using a first reconstruction method, and generate a second reconstruction result based on the raw image data using a second reconstruction method. When executing the instructions, the at least one processor may further cause the system to fuse the first reconstruction result and the second reconstruction result, and generate a reconstructed image based on a result of the fusion.

According to a further aspect of the present disclosure, a non-transitory computer readable medium is provided. The non-transitory computer readable medium may include executable instructions. The instructions, when executed by at least one processor, may cause the at least one processor to implement a method. The method may include acquiring raw image data, wherein the raw image data may include a plurality of frequency domain undersampled image data samples. The method may include generating a first reconstruction result based on the raw image data using a first reconstruction method, and generating a second reconstruction result based on the raw image data using a second reconstruction method. The method may further include fusing the first reconstruction result and the second reconstruction result, and generating a reconstructed image based on a result of the fusion.

In some embodiments, the fusing the first reconstruction result and the second reconstruction result may include one or more of the following operations. The first reconstruction result may be decomposed into a plurality of first sets. The second reconstruction result may be decomposed into a plurality of second sets, wherein each of the plurality of second sets may correspond to one of the plurality of first sets. A confidence level relating to a match between each of the plurality of first sets and the corresponding second set may be determined. Each of the plurality of first sets and the corresponding second set may be fused based on the confidence level.

In some embodiments, the determining a confidence level relating to a match between each of the plurality of first sets and the corresponding second set may include one or more of the following operations. A similarity between a grayscale value of each of the plurality of first sets and a grayscale value of the corresponding second set may be determined. The confidence level may be determined based on the similarity.

In some embodiments, the fusing the first reconstruction result and the second reconstruction result may include one or more of the following operations. The first reconstruction result may be converted to first wavelet domain data. A first sparsity of the first wavelet domain data may be determined. The second reconstruction result may be converted to second wavelet domain data. A second sparsity of the second wavelet domain data may be determined. The first reconstruction result and the second reconstruction result may be fused based on the first sparsity and the second sparsity.

In some embodiments, the first reconstruction method may be compressive sensing method and the second reconstruction method may be deep learning method or the first reconstruction method may be deep learning method and the second reconstruction method may be compressive sensing method.

In some embodiments, the method may further include one or more of the following operations. A third reconstruction result may be obtained based on the raw data using a deep learning method. The first reconstruction result, the second reconstruction result, and the third reconstruction result may be fused.

In some embodiments, the method may further include one or more of the following operations. After fusing the first reconstruction result and the second reconstruction result, whether a preset condition is satisfied may be determined. In response to the determination that the preset condition is not satisfied, the raw image data may be updated based on the result of fusion; in response to the determination that the preset condition is satisfied, the reconstructed image may be generated based on the result of fusion.

In some embodiments, the result of fusion may include frequency domain image data and the generating a reconstructed image based on a result of the fusion may include transforming the result of fusion including frequency domain image data to obtain the reconstructed image.

In some embodiments, the first reconstruction result may include a first image and the second reconstruction result may include a second image. The generating a first reconstruction result based on the raw image data using a first reconstruction method may include reconstructing the first image based on the plurality of frequency domain undersampled image data samples using a compressive sensing method. The generating a second reconstruction result based on the raw image data using a second reconstruction method may include reconstructing the second image based on the plurality of frequency domain undersampled image data samples using a deep learning method.

In some embodiments, the generating a first reconstruction result based on the raw image data using a first reconstruction method may include reconstructing a first image based on the plurality of frequency domain undersampled image data samples using a compressive sensing method and transforming the first image to a first set of frequency domain image data to obtain the first reconstruction result. The generating a second reconstruction result based on the raw image data using a second reconstruction method may include generating a second set of frequency domain image data based on the raw image data using a deep learning method to obtain the second reconstruction result.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant application. However, it should be apparent to those skilled in the art that the present application may be practiced without such details. In other instances, well known methods, procedures, systems, components, and/or circuitry have been described at a relatively high-level, without detail, in order to avoid unnecessarily obscuring aspects of the present application. Various modifications to the disclosed embodiments will be readily apparent to those skilled in the art, and the general principles defined herein may be applied to other embodiments and applications without departing from the spirit and scope of the present application. Thus, the present application is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Figure 2:
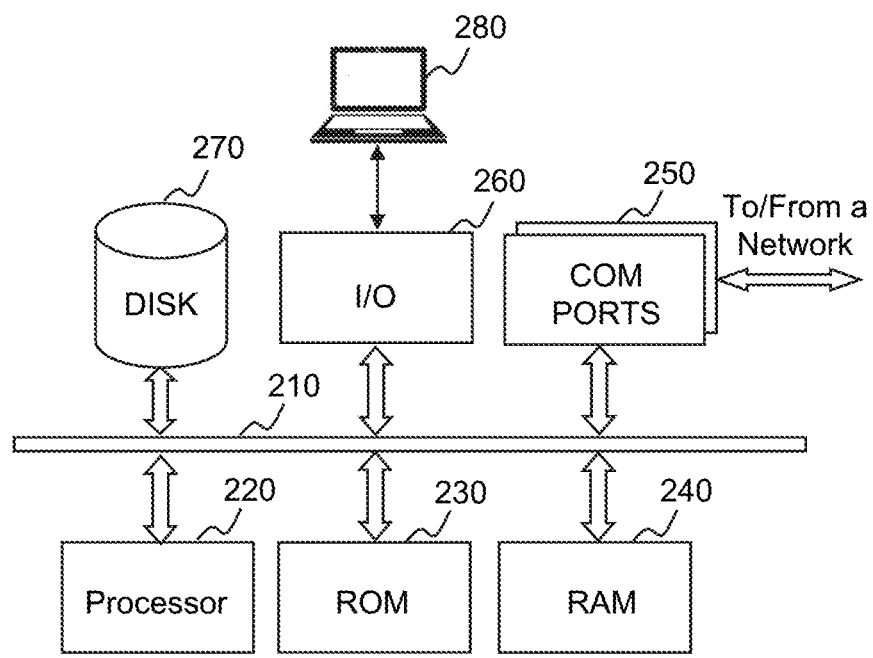
FIG. 2 is a schematic diagram illustrating exemplary hardware and/or software components of an exemplary computing device 200 on which the processing engine 140 may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, module or block is referred to as being "on," "connected to," "communicate with," "coupled to" another unit, module, or block, it may be directly on, connected or coupled to, or communicate with the other unit, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In some embodiments, the imaging system may include one or more modalities including Digital Subtraction Angiography (DSA), Magnetic Resonance Imaging (MRI), Magnetic Resonance Angiography (MRA), Computed tomography (CT), Computed Tomography Angiography (CTA), Ultrasound Scanning (US), Positron Emission Tomography (PET), Single-Photon Emission Computerized Tomography (SPECT), CT-MR, CT-PET, CE-SPECT, DSA-MR, PET-MR, PET-US, SPECT-US, TMS (transcranial magnetic stimulation)-MR, US-CT, US-MR, X-ray-CT, X-ray-MR, X-ray-portal, X-ray-US, Video-CT, Vide-US, or the like, or any combination thereof. In some embodiments, the target region may be an organ, a texture, an object, a lesion, a tumor, or the like, or any combination thereof. Merely by way for example, the target region may include a head, a breast, a lung, a rib, a vertebra, a trachea, a pleura, a mediastinum, an abdomen, a long intestine, a small intestine, a bladder, a gallbladder, a triple warmer, a pelvic cavity, a backbone, extremities, a skeleton, a blood vessel, or the like, or any combination thereof. In some embodiments, the image may include a 2D image and/or a 3D image. In the 2D image, its tiniest distinguishable element may be termed as a pixel. In the 3D image, its tiniest distinguishable element may be termed as a voxel ("a volumetric pixel" or "a volume pixel"). In some embodiments, the 3D image may also be seen as a series of 2D slices or 2D layers.

The present disclosure relates to an image processing system and method for generating a reconstructed image by fusing two reconstruction results. The system may generate a first reconstruction result using compressive sensing method and a second reconstruction result using deep learning method. The system may decompose the first reconstruction result into a plurality of first sets and the second reconstruction result into a plurality of second sets. A similarity between each of the first sets and a corresponding second set may be determined. The system may determine a confidence level based on the similarity between each of the first sets and the corresponding second set, and may fuse the two reconstruction results based on the confidence level. Alternatively, the system may transform the first reconstruction result into first wavelet domain data and the second reconstruction result into second wavelet domain data. The sparsity of the first wavelet domain data and the second wavelet domain data may be determined and the two reconstruction results may be fused based on the sparsity of the first wavelet domain data and second wavelet domain data. For illustration purposes, the following description is provided to help better understanding a segmentation process. It is understood that this is not intended to limit the scope of the present disclosure. For persons having ordinary skills in the art, a certain amount of variations, changes and/or modifications may be deducted under guidance of the present disclosure. Those variations, changes and/or modifications do not depart from the scope of the present disclosure.

Figure 1:
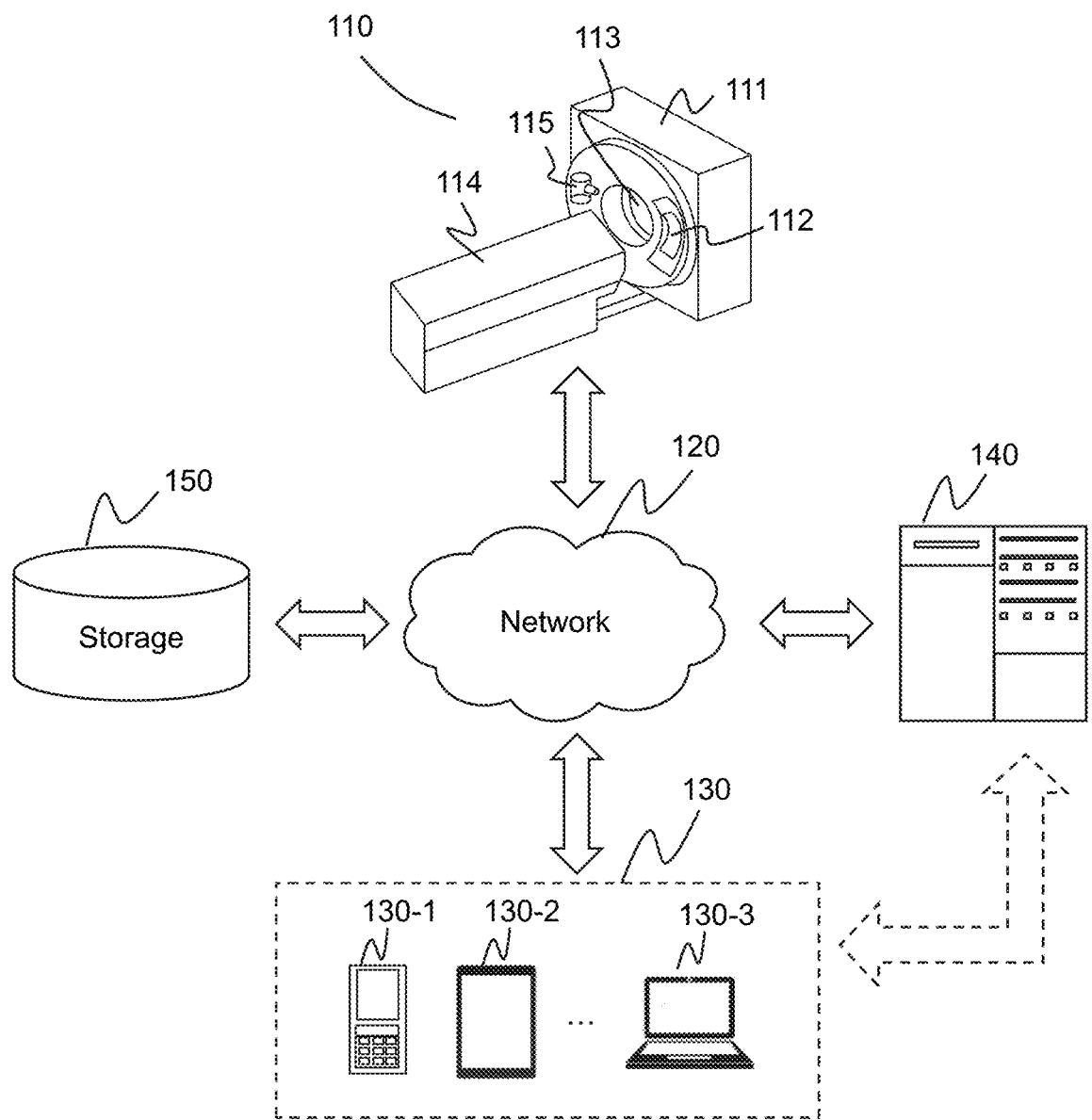
FIG. 1 is a schematic diagram illustrating an exemplary imaging system 100 according to some embodiments of the present disclosure.

FIG. 1 is a schematic diagram illustrating an exemplary imaging system 100 according to some embodiments of the present disclosure. As shown in FIG. 1, the imaging system 100 may include a scanner 110, a network 120, one or more terminals 130, a processing engine 140, and a storage 150. All the components in the imaging system 100 may be interconnected via the network 120.

The scanner 110 may scan an object and generate scanned data relating to the object. In some embodiments, the scanner 110 may be a medical imaging device, for example, a PET device, a SPECT device, a CT device, an MRI device, or the like, or any combination thereof (e.g., a PET-CT device, a PET-MRI device, or a CT-MRI device). The scanner 110 may include a gantry 111, a detector 112, a detecting region 113, and a table 114. In some embodiments, the scanner 110 may also include a radioactive scanning source 115. The gantry 111 may support the detector 112 and the radioactive scanning source 115. An object may be placed on the table 114 for scanning. The radioactive scanning source 115 may emit radioactive rays to the object. The detector 112 may detect radiation events (e.g., gamma photons) emitted from the detecting region 113. In some embodiments, the scanner 110 may be an MRI scanning device and the detector 112 may include an electric circuit for detecting and receiving RF signals.

The network 120 may include any suitable network that can facilitate exchange of information and/or data for the imaging system 100. In some embodiments, one or more components of the imaging system 100 (e.g., the scanner 110, the terminal 130, the processing engine 140, the storage 150, etc.) may communicate information and/or data with one or more other components of the imaging system 100 via the network 120. For example, the processing engine 140 may obtain image data from the scanner 110 via the network 120. As another example, the processing engine 140 may obtain user instructions from the terminal 130 via the network 120. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, witches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

The terminal(s) 130 may include a mobile device 130-1, a tablet computer 130-2, a laptop computer 130-3, or the like, or any combination thereof. In some embodiments, the mobile device 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, an eyeglasses, a helmet, a watch, clothing, a backpack, a smart accessory, or the like, or any combination thereof. In some embodiments, the mobile device may include a mobile phone, a personal digital assistance (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing engine 140.

The processing engine 140 may process data and/or information obtained from the scanner 110, the terminal 130, and/or the storage 150. In some embodiments, the processing engine 140 may be a single server or a server group. The server group may be centralized or distributed. In some embodiments, the processing engine 140 may be local or remote. For example, the processing engine 140 may access information and/or data stored in the scanner 110, the terminal 130, and/or the storage 150 via the network 120. As another example, the processing engine 140 may be directly connected to the scanner 110, the terminal 130 and/or the storage 150 to access stored information and/or data. In some embodiments, the processing engine 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing engine 140 may be implemented by a computing device 200 having one or more components as illustrated in FIG. 2. In some embodiments, the processing engine 140 may reconstruct an image based on raw image data acquired during a medical imaging procedure. The method of reconstruction may include Compressive Sensing (CS), deep learning (DL), or the like, or any combination thereof.

Compressive sensing may refer to a signal acquisition and processing technique for efficiently acquiring and reconstructing a signal. In compressive sensing, reconstruction of a signal may be performed by collecting a limited number of signal samples according to a defined set of sampling functions. The total number of signal samples may be smaller than the number required by Nyquist-Shannon sampling theory but the signal samples may still contain sufficient information for reconstructing an original signal. In compressive sensing, mathematical solutions to a set of linear equations associated with the undersampled sections of the image data may be found. The mathematical solutions may assign the undersampled signal an estimated value based on the sampled signals, and thus a result of reconstruction may be obtained.

Deep learning may be applied to execute a trained image reconstruction model to generate a reconstruction result based on raw image data. The trained image reconstruction model may be obtained by training a preliminary model based on training data. Artificial neural networks (ANN) that contains a multi-layer structure may be involved in the training. The preliminary model may learn features of the training data to adjust each layer of the multi-layer structure. The trained image reconstruction model may predict unknown image data based on the known raw image data. A reconstruction result may be generated based on the raw image data and predicted image data.

The storage 150 may store data, instructions, and/or any other information. In some embodiments, the storage 150 may store data obtained from the terminal 130 and/or the processing engine 140. In some embodiments, the storage 150 may store data and/or instructions that the processing engine 140 may execute or use to perform exemplary methods described in the present disclosure. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more other components in the imaging system 100 (e.g., the processing engine 140, the terminal 130, etc.). One or more components in the imaging system 100 may access the data or instructions stored in the storage 150 via the network 120. In some embodiments, the storage 150 may be directly connected to or communicate with one or more other components in the imaging system 100 (e.g., the processing engine 140, the terminal 130, etc.). In some embodiments, the storage 150 may be part of the processing engine 140.

FIG. 2 is a schematic diagram illustrating exemplary hardware and/or software components of an exemplary computing device 200 on which the processing engine 140 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing engine 140 in accordance with techniques described herein. The computer instructions may include, for example, routines, programs, objects, components, data structures, procedures, modules, and functions, which perform particular functions described herein. For example, the processor 210 may process image data obtained from the scanner 110, the terminal 130, the storage 150, and/or any other component of the imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, in the present disclosure, the processor of the computing device 200 executes both process A and process B (e.g., reconstruction of image by CS method and DL method). However, it should be understood that process A and process B may also be performed by two or more different processors jointly or separately in the computing device 200 (e.g., a first processor reconstruct an image using CS method and a second processor reconstruct an image using DL method).

The storage 220 may store data/information obtained from the scanner 110, the terminal 130, the storage 150, and/or any other component of the imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 140 for determining a regularization item.

The I/O 230 may input and/or output signals, data, information, etc. In some embodiments, the I/O 230 may enable a user interaction with the processing engine 140. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 120) to facilitate data communications. The communication port 240 may establish connections between the processing engine 140 and the scanner 110, the terminal 130, and/or the storage 150. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
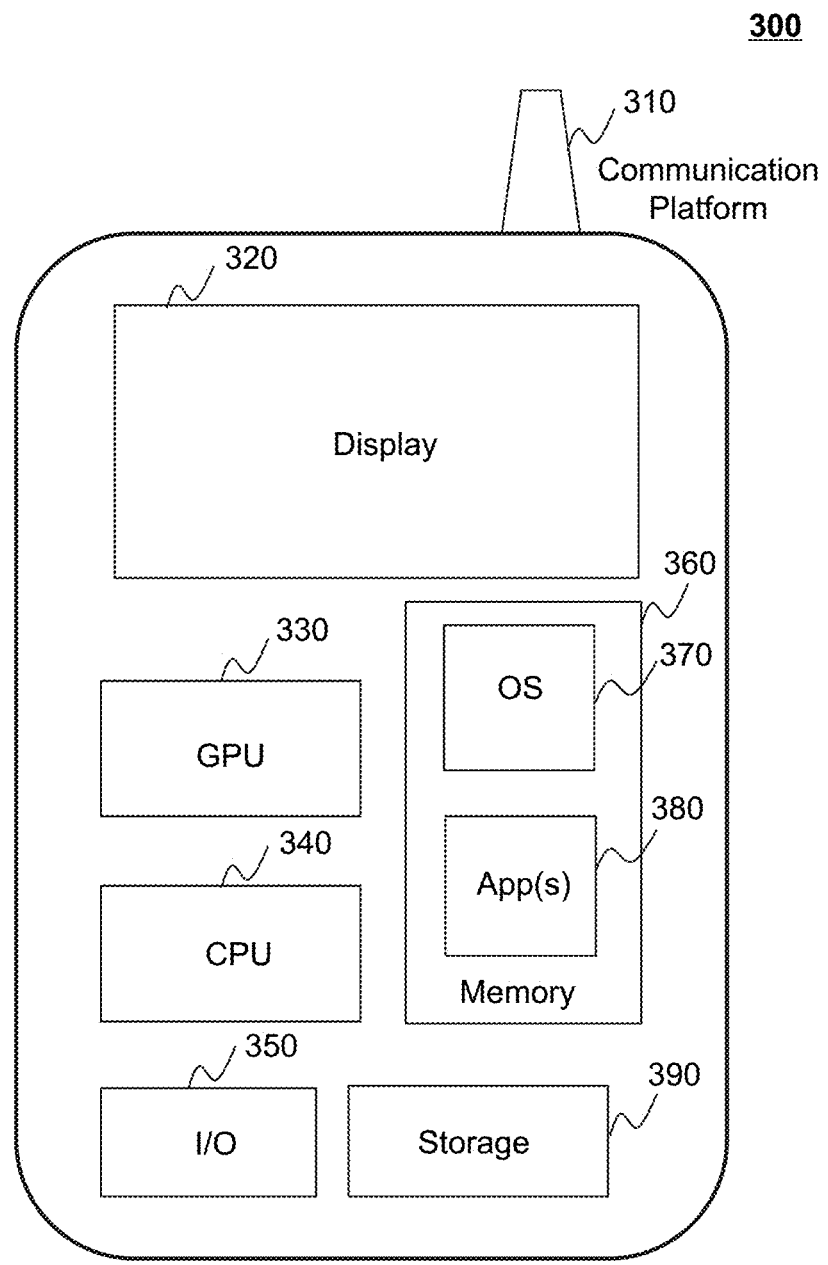
FIG. 3 is a schematic diagram illustrating exemplary hardware and/or software components of an exemplary mobile device 300 on which the terminal 130 may be implemented according to some embodiments of the present disclosure.

FIG. 3 is a schematic diagram illustrating exemplary hardware and/or software components of an exemplary mobile device 300 on which the terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 140. User interactions with the information stream may be achieved via the I/O 350 and provided to the processing engine 140 and/or other components of the imaging system 100 via the network 120.

In some embodiments, the mobile device 300 may transmit instructions to the scanner 110 for scanning an object to obtain raw image data. Alternatively, or additionally, the mobile device 300 may transmit instructions to the processing engine 140 for generating a reconstructed image based on the raw image data. In some embodiments, part or all of the functions of the processing engine 140 may be implemented by the CPU 340 of the mobile device 300.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
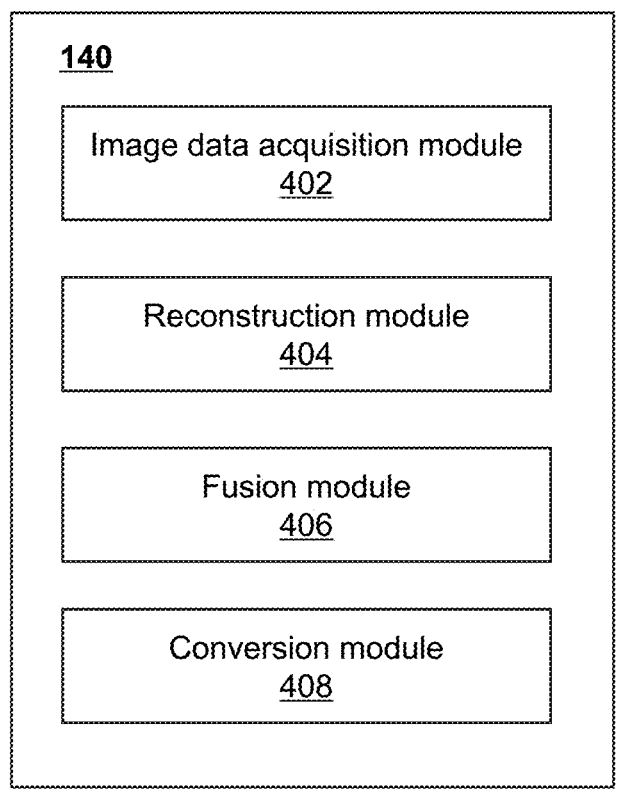
FIG. 4 is a schematic diagram illustrating an exemplary processing engine 140 according to some embodiments of the present disclosure.

FIG. 4 is a schematic diagram illustrating an exemplary processing engine 140 according to some embodiments of the present disclosure. The processing engine 140 may include an image data acquisition module 402, a reconstruction module 404, a fusion module 406 and a conversion module 408. At least a portion of the processing engine 140 may be implemented on a computing device as illustrated in FIG. 2 or a mobile device as illustrated in FIG. 3.

The image data acquisition module 402 may acquire image data. The image data may be acquired from an internal data source of the imaging system 100 (e.g., the scanner 110 or the storage 150) or an external data source connected to the imaging system 100 via the network (e.g., a database located on a cloud).

The image data may relate to an object. In some embodiments, the image data may be generated by a full scanning of an entire body of the object, and the image data generated may include information relating to the entire body of the object. In some embodiments, the image data may be generated by scanning one or more portions of the object, and the image data generated may include information relating to the one or more portions of the object. The one or more portions may include but are not limited to a chest, a trunk, an upper limb, a lower limb, a head, an organ, a tissue, etc. The image data may be 2D image data or 3D image data. The 3D image data may include a plurality of voxels. The 2D image data may include a plurality of pixels. The image data may include MRI image data, CT image data, X-ray image data, ultrasonic image data, PET image data, or the like, or any combination thereof. The image data may include original data generated by the scanner 110, image generated based on the original data, parameters for image generation, or the like, or a combination thereof. The image data may be acquired as k-space data, i.e., in spatial frequency domain. In image reconstruction, the image data may be transformed to other domain data such as time domain and/or frequency domain.

An MR image is a complex-valued map of the spatial distribution of the transverse magnetization in the sample at a specific time point after an excitation. Conventional qualitative interpretation of Fourier Analysis asserts that low spatial frequencies (near the center of k-space) contain the signal to noise and contrast information of the image, whereas high spatial frequencies (outer peripheral regions of k-space) contain the information determining the image resolution. This is the basis for advanced scanning techniques, such as the keyhole acquisition, in which a first complete k-space is acquired, and subsequent scans are performed for acquiring just the central part of the k-space; in this way, different contrast images can be acquired without the need of running full scans.

In MRI physics, k-space is the 2D or 3D Fourier transform of the MR image measured and is in spatial frequency domain. Its complex values are sampled during an MR measurement, in a premeditated scheme controlled by a pulse sequence, i.e. an accurately timed sequence of radiofrequency and gradient pulses. In practice, k-space often refers to the temporary image space, usually a matrix, in which data from digitized MR signals are stored during data acquisition. When k-space is full (at the end of the scan), the data are mathematically processed to produce a final image. Thus, k-space holds raw data before reconstruction.

The reconstruction module 404 may perform an image reconstruction. An image reconstruction may refer to a generation of a medical image or image data based on incomplete image data or undersampled image data. The image reconstruction may include to predict the unknown image information based on the known image information, i.e., the incomplete image data or the sampled image data. The predicted image information is further combined with the sampled image data to generate a medical image with complete information relating to the scanned object. In some embodiments, the reconstruction module 404 may generate a reconstructed image or reconstructed image data based on the image data acquired by the image data acquisition module 402. The reconstruction module 404 may generate a reconstructed image and/or image data using one or more image reconstruction methods including compressive sensing method, deep learning method, or the like, or any combination thereof. In some embodiments, the reconstruction module 404 may generate a plurality of reconstructed images and/or a plurality of sets of reconstructed image data using a plurality of reconstruction methods, respectively. For example, the reconstruction module 404 may generate a reconstructed image using compressive sensing method and reconstructed image data using deep learning method, respectively.

The fusion module 406 may fuse a plurality of reconstruction results. A fusion may refer to a combination of information from a plurality of image and/or image data to a single (or a reduced number of) image or a single set of image data. The fused image or image data may have a higher quality than the images and/or image data before fusion. In addition, the fused image or image data may have more accurate information relating to the scanned object. In some embodiments, the fusion module 406 may fuse a first reconstruction result and a second reconstruction result. The first reconstruction result may be decomposed into a plurality of first sets and the second reconstruction result may be decomposed into a plurality of second sets. In some embodiments, the first sets and/or the second sets may each refer to a region of an image in time domain or a group of values of image data in frequency domain. Each of the second sets may correspond to one of the first sets. The fusion may be performed based on a similarity of each of the first sets and the corresponding second set. In some embodiments, both the first reconstruction result and the second reconstruction result may be medical images reconstructed based on the raw image data. The similarity may be determined based on grayscale values of the first sets and the second sets. In some embodiments, both the first reconstruction result and the second reconstruction result may be k-space data generated from the raw image data. The similarity may be determined based on complex vectors of the first sets and the second sets. In some embodiments, the first reconstruction result and the second reconstruction result may be transformed into wavelet domain data, and the fusion may be performed based on a sparsity of the wavelet domain data.

The conversion module 408 may transform an image or image data in a first domain to a second domain. In some embodiments, the conversion module 408 may transform an image in a time domain to image data in a spatial frequency domain (e.g., a k-space) and vice versa. The conversion module 408 may perform a conversion using one or more methods including a Fourier transform, an Inverse Fourier transform, a radon transform, a wavelet transform, an S-transform, a Laplace transform, a Z-transform, or the like, or any combination thereof. In some embodiments, the conversion module 408 may transform an image in time domain to image data in frequency domain using Fourier transform (FT) or fast Fourier transform (FFT). In some embodiments, the conversion module 408 may transform image data in frequency domain to an image in time domain using inverse fast Fourier transform (IFFT). In some embodiments, the conversion module 408 may transform an image in time domain to image data in wavelet domain using wavelet transform.

Figure 5:
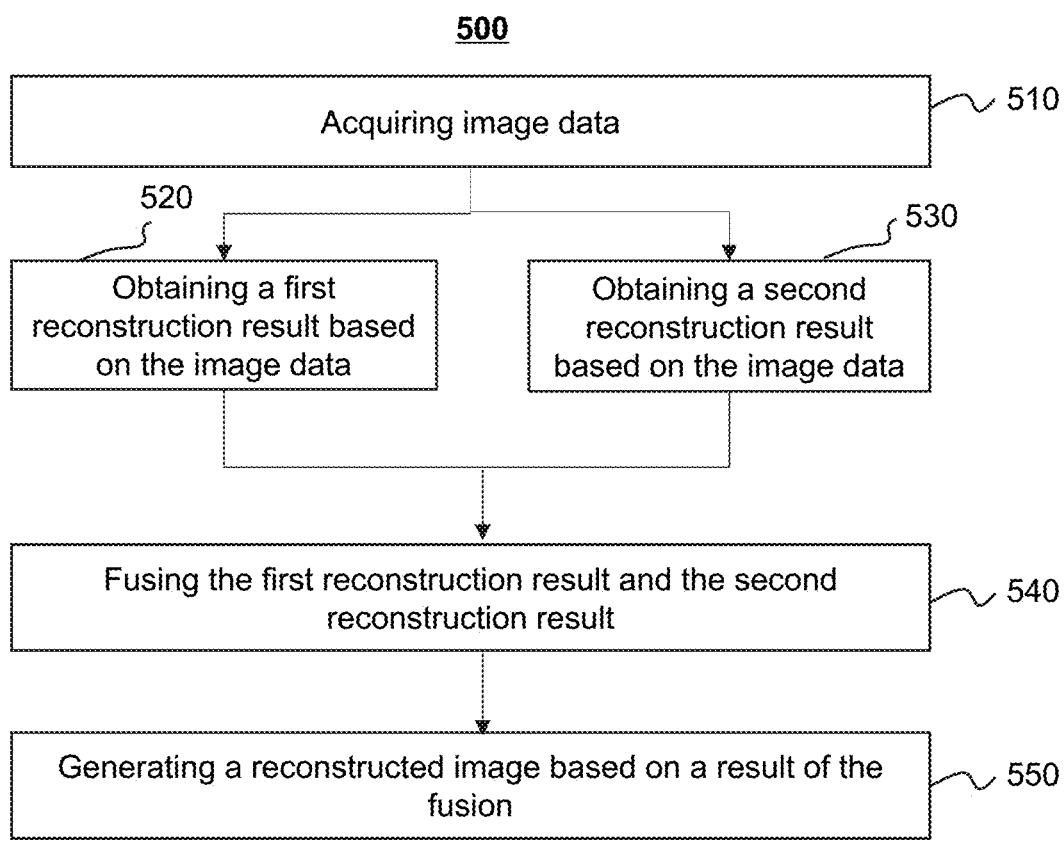
FIG. 5 is a flowchart illustrating an exemplary process for generating a reconstructed image according to some embodiments of the present disclosure.

FIG. 5 is a flowchart illustrating an exemplary process for generating a reconstructed image according to some embodiments of the present disclosure. In some embodiments, the process 500 may be performed by the processing engine 140. At least a portion of the process 500 may be implemented on a computing device 200 as illustrated in FIG. 2 or a mobile device 300 as illustrated in FIG. 3.

In 510, image data may be acquired. In some embodiments, the image data may be k-space data (or referred to as data in spatial frequency domain). k-space is the 2D or 3D Fourier transform of the MR image measured and is in spatial frequency domain. In some embodiments, the image data may be undersampled. The image data may be acquired by sampling signals using compressive sensing method (also referred to as compressive sampling). In some embodiments, the image data may be acquired by the image data acquisition module 402. The image data may be acquired from the scanner 110, the storage 150, the terminal 130 of imaging system 100 and/or the I/O 230 of the computing device 200 via the communication port 240. In some embodiments, the image data may be acquired from an external data source connected to the imaging system 100 via the network 120. The image data may be pre-processed. The pre-processing may include image normalization, image reconstruction, image smoothing, suppressing, weakening, noise reduction, detail reducing, mutation reducing, or the like, or any combination thereof. The pre-processing may make the image in a good condition for reconstruction.

In 520, a first reconstruction result may be obtained based on the image data. In some embodiments, the first reconstruction result may be obtained by the reconstruction module 404. In some embodiments, the first reconstruction result may be a reconstructed image based on the image data. Alternatively, the first reconstruction result may be k-space data generated by processing the obtained image data. The first reconstruction result may be obtained using one or more image reconstruction methods including compressive sensing method, deep learning method, model matching method, filter back-projection (FBP), ordered subset expectation maximization (OS-EM), or the like, or any combination thereof. In some embodiments, a domain transformation may be performed when obtaining the first reconstruction result. In some embodiments, the domain transformation may be performed by the conversion module 408. For example, the image data may be processed using compressive sensing to obtain a raw image or a set of image data, and a fast Fourier transform (FFT) may then be performed on the raw image or a set of image data to obtain reconstructed image data as the first reconstruction result. As another example, an inverse fast Fourier transform (IFFT) may be performed on the image data to obtain a raw image or a set of image data. The raw image or a set of image data may be further processed using deep learning method to obtain a reconstructed image. Then a FFT may be performed on the reconstructed image to obtain reconstructed image data as the first reconstruction result.

In 530, a second reconstruction result may be obtained based on the image data. In some embodiments, the second reconstruction result may be obtained by the reconstruction module 404. In some embodiments, the second reconstruction result may be in a same format as the first reconstruction result. For example, both the first reconstruction result and the second reconstruction result may be images. As another example, both the first reconstruction result and the second reconstruction result may be k-space data. The second reconstruction result may be obtained using one or more image reconstruction methods including compressive sensing method, deep learning method, model matching method, filter back-projection (FBP), ordered subset expectation maximization (OS-EM), or the like, or any combination thereof. In some embodiments, a domain transformation may be performed during the process of obtaining the second reconstruction result. For example, an inverse fast Fourier transform (IFFT) may be performed for the image data to obtain a raw image. The raw image may then be processed using deep learning method to obtain a reconstructed image data as the second reconstruction result.

In some embodiments, the first reconstruction result and the second reconstruction result may be obtained using different methods. For example, the first reconstruction result may be acquired by processing image data using compressive sensing method, and the second reconstruction result may be acquired by processing the image data using deep learning method. As another example, the first reconstruction result may be acquired using a first deep learning method, and the second reconstruction result may be acquired using a second deep learning method. In some embodiments, the first reconstruction result and the second reconstruction result may have a same dimension. For example, the first reconstruction result and the second reconstruction result may be images with a same resolution. In some embodiments, multiple reconstruction results may be obtained based on the image data. For example, a first reconstruction result may be obtained using a compressive method, a second reconstruction result may be obtained using a first deep learning method, and a third reconstruction result may be obtained using a second deep learning method. The first deep learning method and the second deep learning method may employ different image reconstruction models.

In 540, the first reconstruction result and the second reconstruction result (and the third reconstruction result if there exists one) may be fused. When multiple reconstruction results are obtained based on the image data, the multiple reconstruction results may be fused. In some embodiments, the first reconstruction result and the second reconstruction result may be fused by the fusing module 406. In some embodiments, the first reconstruction result may be decomposed into a plurality of first sets and the second reconstruction result may be decomposed into a plurality of second sets. Each of the second sets may correspond to one of the first sets. The fusion may be performed based on a similarity of each of the first sets and a corresponding second set. In some embodiments, both the first reconstruction result and the second reconstruction result may be images. The similarity between the first sets and the second sets may be determined based on grayscale values of the first sets and the second sets. In some embodiments, both the first reconstruction result and the second reconstruction result may be k-space data. The similarity may be determined based on complex vectors of the first sets and the second sets. In some embodiments, the first reconstruction result and the second reconstruction result may be transformed into wavelet domain data, and the fusion may be performed based on a sparsity of the wavelet domain data. More descriptions regarding the fusion may be found elsewhere in the present disclosure, for example, FIGS. 8 and 9, and the descriptions thereof.

In 550, a reconstructed image may be obtained based on a result of the fusion. In some embodiments, the result of the fusion may be a fused image in time domain, and the reconstructed image may be obtained directly from the result of the fusion. In some embodiments, the result of the fusion may be fused image data in frequency domain, and the reconstructed image may be obtained by transforming the result of the fusion into time domain.

Figure 6:
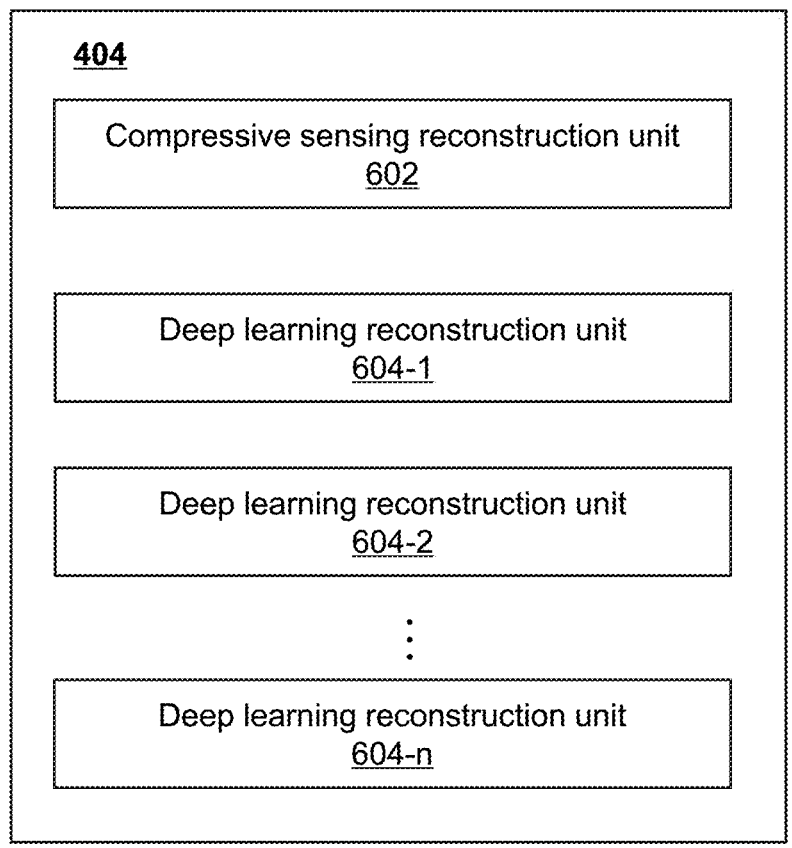
FIG. 6 is a block diagram illustrating an exemplary reconstruction module according to some embodiments of the present disclosure.

FIG. 6 is a block diagram illustrating an exemplary reconstruction module according to some embodiments of the present disclosure. The reconstruction module 404 may include a compressive sensing reconstruction unit 602 and one or more deep learning reconstruction unit 604. At least a portion of the reconstruction module 404 may be implemented on a computing device as illustrated in FIG. 2 or a mobile device as illustrated in FIG. 3.

The compressive sensing reconstruction unit 602 may reconstruct an image using compressive sensing method. Compressive sensing may refer to a signal acquisition and processing technique for efficiently acquiring and reconstructing a signal. In compressive sensing, reconstruction of a signal may be performed by collecting a limited number of signal samples according to a defined set of sampling functions. The total number of signal samples may be smaller than the number required by Nyquist-Shannon sampling theory but the signal samples may still contain sufficient information for reconstructing an original signal. In compressive sensing, mathematical solutions to a set of linear equations associated with the undersampled sections of the image data may be found. The mathematical solutions may assign the undersampled signal an estimated value based on the sampled signals, and thus a result of reconstruction may be obtained.

In some embodiments, the compressive sensing reconstruction unit 602 may reconstruct an image based on raw image data. The raw image data may be raw k-space data. A limited number of signal sampling may be made in k-space, and thus a limited amount of data (also referred to as raw k-space data) may be acquired. The compressive sensing reconstruction unit 602 may estimate unknown data based on the known raw K-space data using one or more mathematical solutions. Reconstruction may be performed based on the raw k-space data and the estimated data. Exemplary methods of compressive sensing may be described in Lustig et al. (Lustig M, Donoho D L, Santos J M, et al. "Compressed Sensing MRI". *IEEE Signal Processing Magazine*, 2008, 25(2):72-82.)

The deep learning reconstruction unit 604 may reconstruct an image using deep learning method. In some embodiments, the deep learning reconstruction unit 604 may include one or more deep learning reconstruction units, for example, the deep learning reconstruction unit 1 604-1, the deep learning reconstruction unit 2 604-2, a deep learning reconstruction unit n 604-n, or the like, or any combination thereof. In some embodiments, each of the deep learning reconstruction units 604 may include an image reconstruction model. To obtain the image reconstruction model, a preliminary model may be acquired and a set of training data may be acquired for training the preliminary model. In some embodiments, the training data may include input training data and output training data. In some embodiments, each input training data item may correspond to an output training data item. For example, the input training data and its corresponding output training data may be obtained from information related to a same object or a same tissue or organ. The input training data and the output training data may be in format of images in time domain or image data in k-space. The format of the input training data and the output training data may be the same or different. For example, both the input training data and output training data may be images. As another example, the input training data may be images and the output training data may be image data. In some embodiments, the output training data may have higher quality than the input training data. For example, an output training image may have higher resolution than its corresponding input training image. In some embodiments, the input training data may be undersampled. For example, a part of sampled input training data may be deleted to simulate an undersampled condition. Exemplary methods of deep learning may be described in Dong et al. (Dong C, Chen C L, He K, et al. "Learning a Deep Convolutional Network for Image Super-Resolution" *Computer Vision—ECCV* 2014. Springer International Publishing, 2014:184-199.)

The image reconstruction model may include a multilayer structure. The image reconstruction model may include, for example, deep neural networks, deep belief networks, convolutional neural networks, convolutional deep belief networks, deep Boltzmann machines, stacked auto-encoders, deep stacking networks, deep coding networks, deep kernel machines, or the like, or any combination thereof. In some embodiments, one or more features may be extracted from the input training data. An initial layer of the multilayer structure may learn the feature(s) extracted from the training input data, and the learned feature(s) may serve as input data for a next layer. Other layers of the multilayer structure may learn one or more features in its input data obtained from its previous layer. The last layer of the multilayer structure may output a result corresponding to one of the output training data. The multilayer structure may be modified based on the learning of each layer to generate the trained image reconstruction model.

In some embodiments, the deep learning reconstruction unit 604 may process an input image (or image data) to obtain an output image (or image data). The output image (or image data) may have a higher quality than the input image (or image data).

Figure 7:
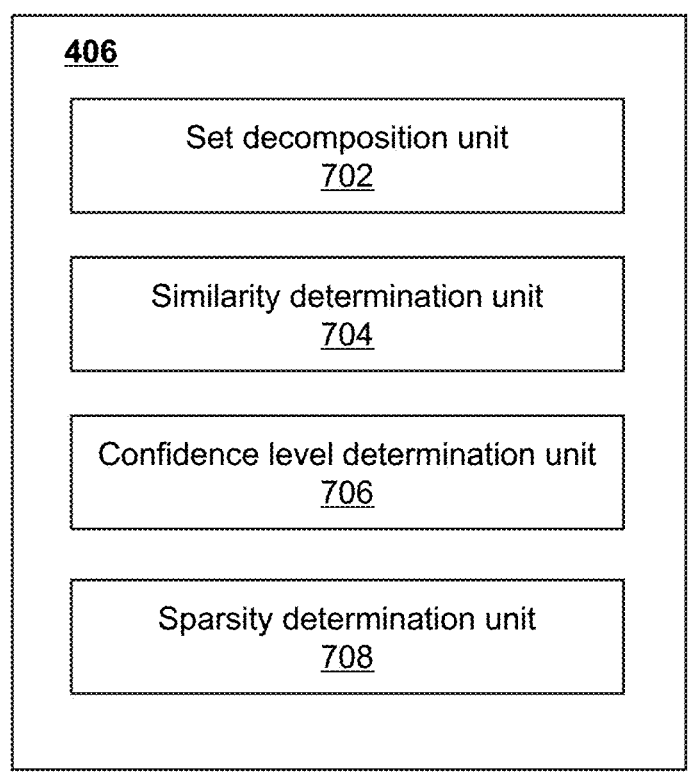
FIG. 7 is a block diagram illustrating an exemplary fusion module according to some embodiments of the present disclosure.

FIG. 7 is a block diagram illustrating an exemplary fusion module according to some embodiments of the present disclosure. The fusion module 406 may include a set division unit 702, a similarity determination unit 704, a confidence level determination unit 706, and a sparsity determination unit 708. At least a portion of the fusion module 406 may be implemented on a computing device 200 as illustrated in FIG. 2 or a mobile device 300 as illustrated in FIG. 3.

The set division unit 702 may decompose a reconstruction result into a plurality of sets. In some embodiments, the plurality of sets may each refer to a region of an image in time domain or a group of values of image data in frequency domain. In some embodiments, the set division unit 702 may decompose a reconstruction result into a plurality of sets of a same size. For example, the set division unit 702 may decompose a reconstructed image into a plurality of sets, each set including the same number of pixels (or the same number of voxels for 3D images). The plurality of sets may overlap with each other. In some embodiments, the set division unit 702 may decompose a plurality of reconstruction results each into a plurality of sets. The plurality of sets in the plurality of reconstruction results may correspond to each other. For example, each of a plurality of first sets in a first reconstruction result may correspond to one of a plurality of second sets in a second reconstruction result.

The similarity determination unit 704 may determine a similarity between the grayscale values of the corresponding plurality of sets in a plurality of reconstruction results. Taking first sets of a first reconstruction result and second sets of a second reconstruction result as an example, each of the plurality of the first sets and the second sets may include only one pixel, and the similarity may be directly determined by comparing the grayscale value of the first set and the grayscale value of the second set. For example, a smaller difference between grayscale value of the first set and the second set may indicate a higher similarity between the first set and the corresponding second set. Alternatively, each of the plurality of first sets and the plurality of second sets may include a plurality of pixels, and the similarity may be determined by identifying a Euclidean distance of the first set and the corresponding second set. A Euclidean distance may refer to a straight-line distance between two points in Euclidean space. In some embodiments, the first set and the corresponding second set may be projected into two points in Euclidean space, and a Euclidean distance between the two points may be determined. A shorter Euclidean distance may indicate a higher similarity between the first set and the corresponding second set.

The confidence level determination unit 706 may determine a confidence level based on the similarity. A confidence level may refer to a reliability level for recovering a real image and/or image data based on a reconstruction result. The confidence level may have a value between 0 and 1. The confidence level determination unit 704 may determine the confidence level of the reconstruction results based on a similarity between the reconstruction results. In some embodiments, a higher similarity may indicate a higher confidence level.

In some embodiments, the confidence level determination unit 706 may determine the confidence level by performing a transform on the similarity. The transform may be performed based one or more non-linear functions including, a Gaussian function, a cosine function, a negative log function, or the like, or any combination thereof.

In some embodiments, the conversion module 408 may transform a reconstruction result into wavelet domain data by performing a wavelet transform. A wavelet may refer to a wave-like oscillation which is intentionally crafted to have specific properties that are useful for signal processing. A wavelet transform may refer to a mathematical function that transforms data into a time-frequency representation for continuous-time signals.

The sparsity determination unit 708 may determine a sparsity of wavelet domain data. A sparsity may refer to a degree representing the number of zero values in wavelet domain data. In some embodiments, sparsity determination unit 708 may determine the sparsity based on a number of non-zero values and a number of zero values (or a ratio therebetween) in the wavelet domain data. In some embodiments, a reconstruction result (e.g., the first reconstruction result, the second reconstruction result) may be composed into a plurality of sets. The plurality of sets may be transformed into a plurality of sets of wavelet domain data, and a sparsity may be determined for each of the plurality of sets of the wavelet domain data.

Figure 8:
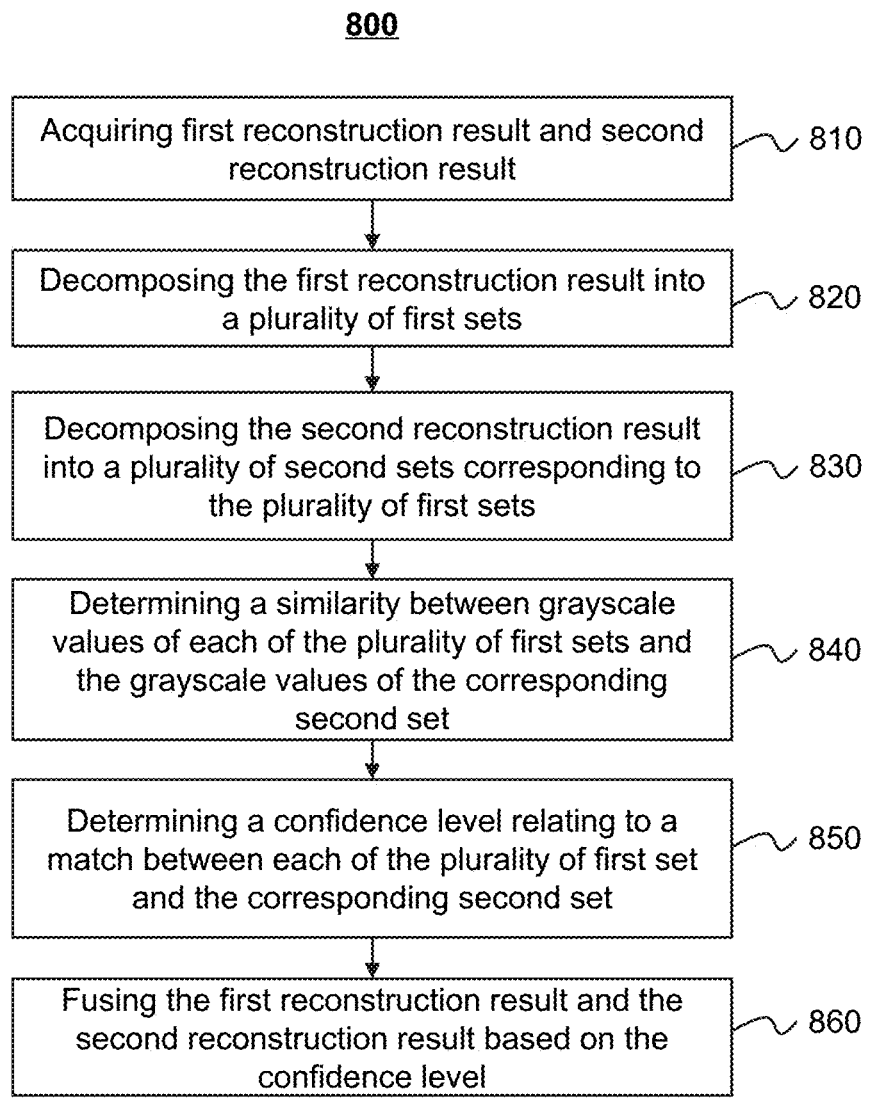
FIG. 8 is a flowchart illustrating an exemplary process for fusing two reconstruction results according to some embodiments of the present disclosure.

FIG. 8 is a flowchart illustrating an exemplary process for fusing two reconstruction results according to some embodiments of the present disclosure. In some embodiments, the process 800 may be performed by the fusion module 406. At least a portion of the process 800 may be implemented on a computing device as illustrated in FIG. 2 or a mobile device as illustrated in FIG. 3.

In 810, a first reconstruction result and a second reconstruction result may be acquired. The first reconstruction result and the second reconstruction result may be acquired using different method as mentioned in the present disclosure. In some embodiments, both the first reconstruction result and the second reconstruction result may be images. Alternatively, both the first reconstruction result and the second reconstruction result may be k-space data.

In 820, the first reconstruction result may be decomposed into a plurality of first sets. The plurality of first sets may have a same size as each other. In some embodiments, the first reconstruction result may be an image, and the image may be divided into a plurality of regions. Each region may include one or more pixels (or voxels for 3D images). In some embodiments, the plurality of regions may overlap with each other. For example, an image with 9 pixels (e.g., a resolution of 3×3) may be divided into four regions, each region having a resolution of 2×2. A center pixel of the 3×3 image may be overlapped by all four regions. A middle pixel of each line and each column of the 3×3 image (except the center pixel) may be overlapped by two regions. Edges of the first reconstruction result may be included in only one region.

In 830, the second reconstruction result may be decomposed into a plurality of second sets corresponding to the plurality of first sets. The first reconstruction result and the second reconstruction result may have same or different sizes. In some embodiments, the second reconstruction result may be decomposed into a same number of sets as the first reconstruction result. The sizes of the plurality of first sets and the plurality of second sets may be the same.

In 840, a similarity between grayscale values of each of the plurality of first sets and the grayscale values of the corresponding second set may be determined. In some embodiments, each of the plurality of first sets and the plurality of second sets may include only one pixel, and the similarity may be directly determined by comparing the grayscale values of the first set and the grayscale values of the second set. For example, a smaller difference between grayscale value of the first set and the second set may indicate a higher similarity between the first set and the second set.

In some embodiments, each of the plurality of first sets and the plurality of second sets may include two or more pixels, and the similarity may be determined by identifying a Euclidean distance of the first set and the corresponding second set. A Euclidean distance may refer to a straight-line distance between two points in Euclidean space. In some embodiments, the first set and the corresponding second set may be projected into two points in Euclidean space, and a Euclidean distance between the two points may be determined. A shorter Euclidean distance may indicate a higher similarity between the first set and the second set.

In 850, a confidence level relating to a match between each of the plurality of first sets and the corresponding second set may be determined. A confidence level may refer to reliability level of the first set and the corresponding second set for recovering a real image and/or image data based on the raw image data. The confidence level may have a value between 0 and 1. In some embodiments, a higher similarity determined in 840 may indicate a higher confidence level. In some embodiments, the confidence level may be determined by performing a transform on the similarity. The transform may be performed based one or more non-linear functions including, a Gaussian function, a cosine function, a negative log function, or the like, or any combination thereof.

In 860, the first reconstruction result and the second reconstruction result may be fused based on the confidence level determined in 850. In some embodiments, a weight may be determined for each of the plurality of first sets and the corresponding second set based on the confidence level determined in 850. For example, the first reconstruction result may be an image with a resolution of 3×3 and may be divided into four regions (also referred to as first regions or first sets), each region including 4 pixels. The second reconstruction result may also be an image with a resolution of 3×3 and may be divided into four regions (also referred to as second regions or second sets), each region including 4 pixels. Each of the second regions may correspond to one of the first regions. The center pixel of the first reconstruction result may be overlapped by all four first regions, and the center pixel of the second reconstruction result may be overlapped by all four second regions. The fusion of the first reconstruction result and the second reconstruction result may also be an image with a resolution of 3×3. A weight may be determined for each of the first regions and the corresponding second region based on the corresponding confidence level. A higher confidence level may indicate a higher weight being assigned to the each of the first regions and the corresponding second region. Four weights may be determined corresponding to the four first regions and second regions. The summation of the weights assigned to the four first regions and the corresponding second regions may be one. To determine a grayscale value of a center pixel of the fused image, grayscale values of pixels in each of the first regions and the second regions that overlap the center pixel of the first reconstruction result (e.g., all four regions) may be determined. Four estimated grayscale values of the center pixel may be determined based on each of the first regions and the corresponding second region. The four estimated grayscale values may be multiplied by the corresponding weight. Further, the multiplication results may be summed up and the grayscale value of the center pixel may be determined. Similarly, the grayscale values of other pixels may be determined.

Figure 9:
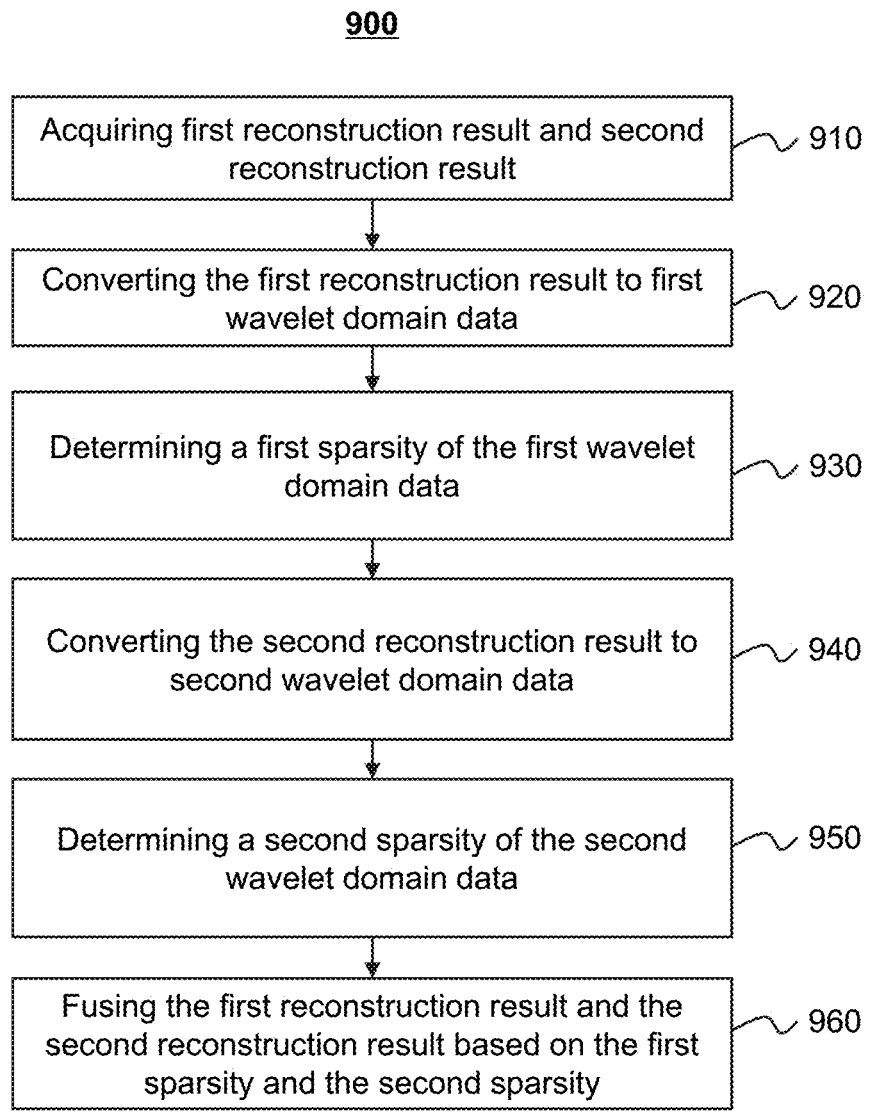
FIG. 9 is a flowchart illustrating an exemplary process for fusing two reconstruction results according to some embodiments of the present disclosure.

FIG. 9 is a flowchart illustrating an exemplary process for fusing two reconstruction results according to some embodiments of the present disclosure. In some embodiments, the process 900 may be performed by the fusion module 406. At least a portion of the process 900 may be implemented on a computing device 200 as illustrated in FIG. 2 or a mobile device 300 as illustrated in FIG. 3.

In 910, a first reconstruction result and a second reconstruction result may be acquired. In some embodiments, the first reconstruction result and the second reconstruction result may be acquired using different methods as mentioned in the present disclosure. In some embodiments, both the first reconstruction result and the second reconstruction result may be images. Alternatively, both the first reconstruction result and the second reconstruction result may be k-space data.

In 920, the first reconstruction result may be transformed into first wavelet domain data using wavelet transform. A wavelet may refer to a wave-like oscillation which is intentionally crafted to have specific properties that are useful for signal processing. A wavelet transform may refer to a mathematical function that transforms data into a time-frequency representation for continuous-time signals. In some embodiments, the first reconstruction result may be decomposed into a plurality of first sets, and each of the first sets may be transformed into wavelet domain data. Exemplary methods of wavelet transform may be described in Zhou et al. (Zhou, Jianping, A. L. Cunha, and M. N. Do. "Nonsubsampled contourlet transform: Construction and application in enhancement." *IEEE International Conference on Image Processing,* 2005:469-472.)

In 930, a first sparsity of the first wavelet domain data may be determined. A sparsity may refer to a degree representing the number of zero values in the data. In some embodiments, the first sparsity may be determined based on a number of non-zero values and a number of zero values (or a ratio therebetween) in the first wavelet domain data. In some embodiments, the plurality of first sets decomposed in the first reconstruction result may be transformed into a plurality of sets of first wavelet domain data, and a sparsity may be determined for each of the sets of the first wavelet domain data.

In 940, the second reconstruction result may be transformed to second wavelet domain data. In some embodiments, the second reconstruction result may be decomposed into a plurality of second sets corresponding to the plurality of first sets, and each of the second sets may be transformed into wavelet domain data.

In 950, a second sparsity of the second wavelet domain data may be determined. In some embodiments, the second sparsity may be determined based on a number of non-zero values and a number of zero values (or a ratio therebetween) in the second wavelet domain data. In some embodiments, the plurality of second sets decomposed in the second reconstruction result may be transformed into a plurality of sets of second wavelet domain data, and a sparsity may be determined for each of the sets of second wavelet domain data.

In 960, the first reconstruction result and the second reconstruction result may be fused based on the first sparsity and the second sparsity. In some embodiments, a reconstruction result that includes a lower sparsity in its corresponding wavelet domain data may be determined to be a more reliable reconstruction result. For example, if the first sparsity is lower than the second sparsity, the first reconstruction result may be determined to be a more reliable reconstruction result than the second reconstruction result. In some embodiments, the more reliable reconstruction result or the better set may be retained to generate a fusion result and the less reliable reconstruction result or the less reliable set may be discarded. In some embodiments, the sparsity of each of the plurality of first sets decomposed in the first reconstruction result and the sparsity of a corresponding second set may be compared, and a set that has a lower sparsity may be determined to be a target set. The fusion may be performed by combining all the target sets to generate a fused image.

Figure 10:
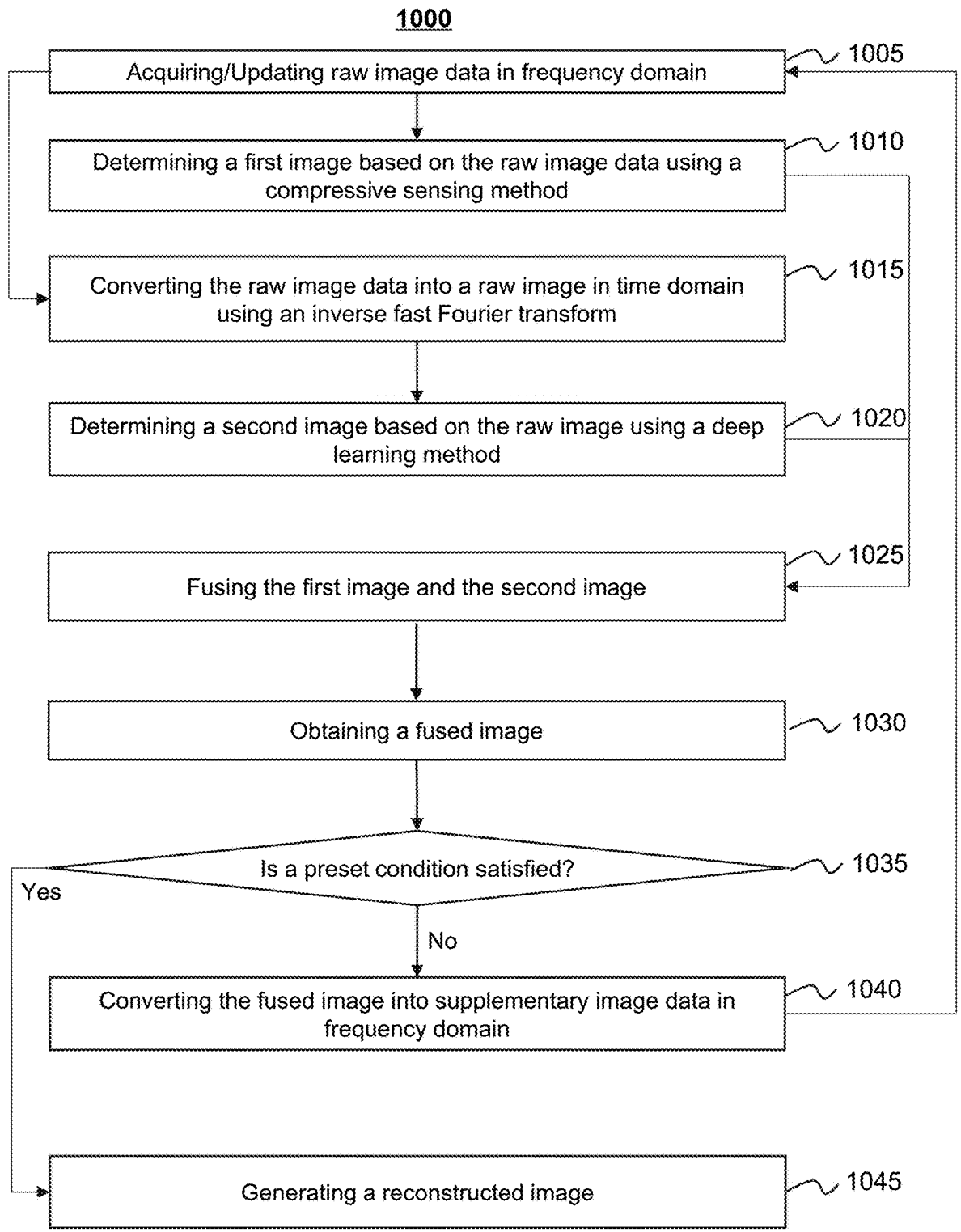
FIG. 10 is a flowchart illustrating an exemplary process 1000 for obtaining a reconstructed image according to some embodiments of the present disclosure.

FIG. 10 is a flowchart illustrating an exemplary process 1000 for obtaining a reconstructed image according to some embodiments of the present disclosure. At least a portion of the process 1000 may be implemented on a computing device 200 as illustrated in FIG. 2 or a mobile device 300 as illustrated in FIG. 3.

In 1005, raw image data in spatial frequency domain (or referred to ask-space data) may be acquired. In some embodiments, the raw image data may be undersampled and include a plurality of undersampled image data samples. For example, a part of the raw image data may be incomplete (or missing due to not collected). During the image reconstruction, the part of the raw image data that is incomplete may be pre-filled with a default value (e.g., zero). The raw image data may be acquired by sampling signals using compressive sensing method (also referred to as compressive sampling).

In 1010, a first image may be determined based on the raw image data using a compressive sensing method. The method of compressive sensing may correspond to those described in the compressive sensing reconstruction unit 602, and is not repeated herein. In some embodiments, the first image may refer to a reconstructed image using the compressive sensing method based on the plurality of undersampled image data samples. During the image reconstruction, the part of the raw image data that is pre-filled with default values is updated with values estimated using compressive sensing method based on the plurality of undersampled image data samples.

In 1015, the raw image data may be transformed into a raw image in time domain using inverse fast Fourier transform.

In 1020, a second image may be determined based on the raw image using deep learning method. The method of deep learning may correspond to those described in the deep learning reconstruction unit 604, and is not repeated herein. In some embodiments, the second image may refer to a reconstructed image using the deep learning method based on the plurality of undersampled image data samples. During the image reconstruction, the part of the raw image data that is pre-filled with default values is updated with values estimated using deep learning method based on the plurality of undersampled image data samples.

In 1025, the first image and the second image may be fused. The method of fusion may correspond to those described in operations 820 through 860, or operations 920 through 960, and is not repeated herein.

In 1030, a fused image may be obtained. In some embodiments, the fusion in operation 1025 may be performed in a time domain, and the fused image may be directly obtained from a result of the fusion. The fused image may include fused information individually reconstructed via compressive sensing method and deep learning method based on the plurality of undersampled image data samples. As such, at least some of pixels in the fused image that are pre-filled with default values may be completed with estimated values (e.g., filled with estimated values) after the fusion.

In some embodiments, the process 1000 may be an iterative process. For example, in each iteration, the processing engine 140 may determine whether a preset condition is satisfied in 1035. The preset condition may include a preset number of iterations, a preset degree of improvement in the fused image comparing with the raw image data or the fused image in the previous iterations. The preset degree of improvement may include a threshold of a sparsity difference between the sparsity of the fused image (or the corresponding image data) in the present iteration and the sparsity of the fused image in the preceding iteration. The preset degree of improvement may also include a threshold of a resolution difference between the fused image in the present iteration and the fused image in the preceding iteration In response to the determination that the preset condition is satisfied (e.g., the number of iterations exceeds the preset number of iterations or the degree of improvement between successive iterations is smaller than the preset degree of improvement), the process 1000 may proceed to 1045; otherwise, the process 1000 may proceed to 1040.

In 1040, the fused image may be transformed into supplementary image data in frequency domain. In some embodiments, the fused image may be transformed using fast Fourier transform (FFT). Then the process 1000 may proceed back to 1005 and the raw image data may be updated based on the supplementary image data. For example, the raw image data may be undersampled and may contain zero values. The zero values may be updated based on the values in the supplementary image data. The original non-zero values in the raw image data may be unchanged. Alternatively, the original non-zero values may also be updated based on the values in the supplementary image data.

In the second iteration, the raw image data may be updated based on the supplementary image data in the first iteration. In the following iterations, the raw image data (or the updated raw image data) may be further updated based on the supplementary image data in the preceding iteration and/or the supplementary image data in previous iterations.

In 1045, a reconstructed image may be generated. In some embodiments, the reconstructed image may be generated directly from the fused image. In some embodiments, the reconstructed image may be generated by post-processing the fused image. The post-processing may include image normalization, image smoothing, suppressing, weakening, noise reduction, detail removing, mutation removing, or the like, or any combination thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in operation 1010, first image data may be obtained using a compressive sensing method, and in operation 1020, second image data may be obtained using a deep learning method. The first image data and the second image data may each include estimated information with respect to the part of the raw data that is incomplete. In operation 1025, the fusion may be performed in a frequency domain based on the estimations of the first image data and the second image data on the part of the raw data that is incomplete. The fused image may be obtained in operation 1030 by transforming the result of the fusion in the frequency domain into an image in a time domain using, e.g., IFFT.

FIGS. 11A-11D are schematic diagram illustrating exemplary processes for generating reconstructed image based on raw image data. For brevity, "image data" described in FIGS. 11A-11D may refer to data of image in k-space (frequency domain) and "image" described in FIGS. 11A-11D may refer to an image in time domain. However, it should be understood for those skilled in the art that modifications and variations may be made to the FIGS. 11A-11D without departing from the spirit of the present disclosure.

These modifications and variations are still within the protection scope of the present disclosure.

Figure 11A:
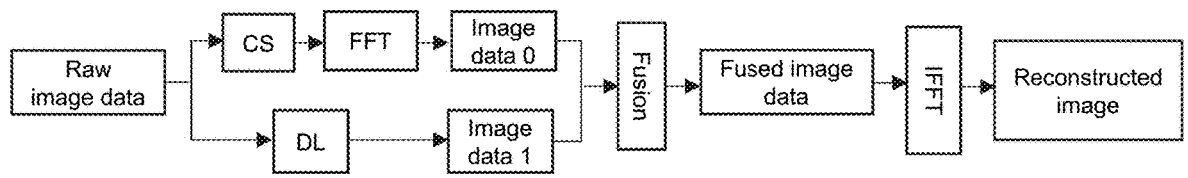
FIGS. 11A-11D are schematic diagrams illustrating exemplary processes for generating reconstructed image based on raw image data according to some embodiments of the present disclosure.

As shown in FIG. 11A, raw image data may be obtained. Image 0 (not shown in the figure) may be obtained based on the raw image data using CS method. Image 0 may be transformed into image data 0 using Fast Fourier Transform (FFT). Image data 1 may be obtained based on the raw image data using DL method. Image data 0 and image data 1 may be fused to generate a fused image data. An Inverse Fast Fourier Transform (IFFT) may be performed on the fused image data to generate a reconstructed image.

Figure 11B:
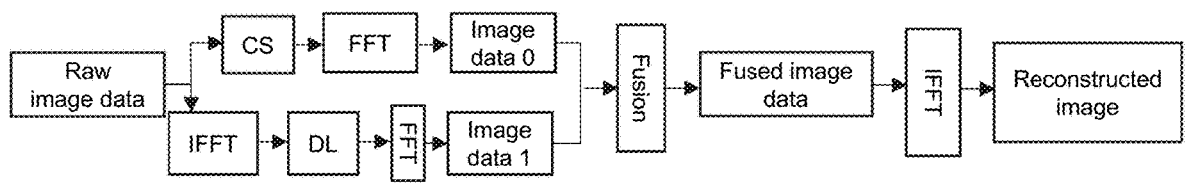

As shown in FIG. 11B, raw image data may be obtained. Image 0 may be obtained based on the raw image data using CS method. Image 0 may be transformed into image data 0 using Fast Fourier Transform (FFT). An IFFT may be performed on the raw image data to generate a raw image. Image 1 may be generated based on the raw image using DL method, and image 1 may be transformed to image data 1 using FFT. Similarly, image data 0 and image data 1 may be fused to generate a fused image data. An Inverse Fast Fourier Transform (IFFT) may be performed on the fused image data to generate a reconstructed image.

Figure 11C:
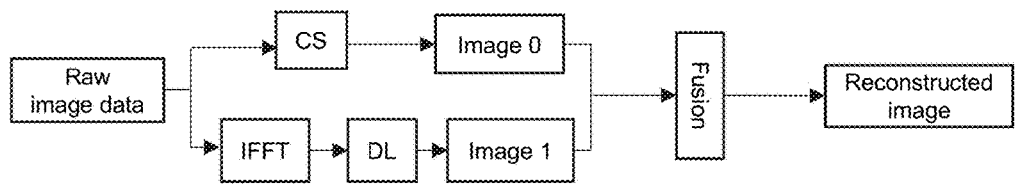

As shown in FIG. 11C, raw image data may be obtained. An image 0 may be obtained based on the raw image data using CS method. Image data 1 may be obtained based on the raw image data using IFFT. An image 1 may then be obtained by employing DL method based on image data 1. The image 0 and image 1 may be fused to generate a reconstructed image.

Figure 11D:
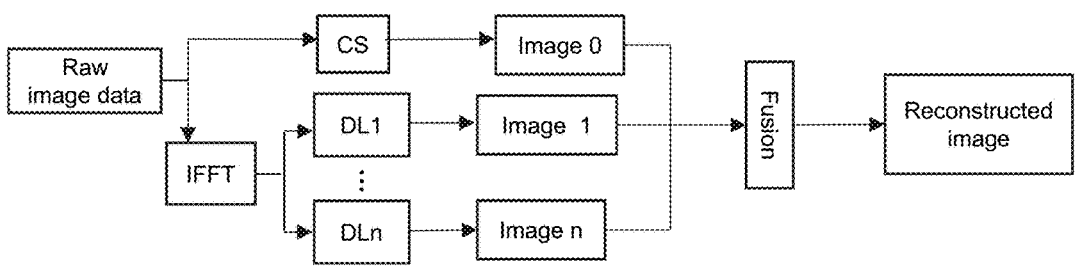

As shown in FIG. 11D, raw image data may be obtained. An image 0 may be obtained in a way similar to those described in FIG. 11C. The method of generating the image 1 may be repeated multiple times to generate images 2-n. The images 2-n may be generated based on same or different image reconstruction models when employing DL method. The images 0-n may be fused to generate a reconstructed image.

Figure 12A:
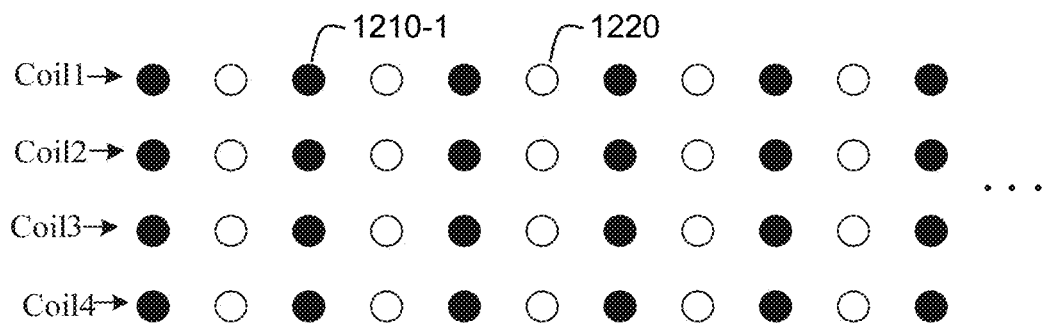
FIG. 12A is a schematic diagram illustrating undersampled raw data according to some embodiments of the present disclosure.

FIG. 12A is a schematic diagram illustrating undersampled raw data according to some embodiments of the present disclosure. Coil 1, Coil 2, Coil 3 and Coil 4 may represent a first radio frequency (RF) coil, a second RF coil, a third RF coil and a fourth RF coil, respectively. Each RF coil may correspond to a channel. In each channel, black dots (e.g., black dot 1210-1) may each represent a sampled data sample (e.g. a locus and/or a data line of the sampled data in an undersampled region), and white dots (e.g., the white dot 1220) may each represent an undersampled data sample. The undersampled data sample may be estimated/reconstructed by one or more methods mentioned in the present disclosure, including but not limited to a compressive sensing method and/or a deep learning method.

Figure 12B:
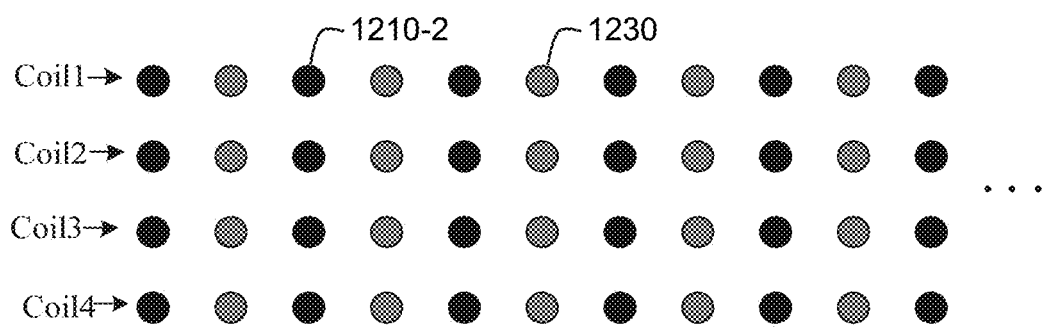
FIG. 12B is a schematic diagram illustrating reconstructed data according to some embodiments of the present disclosure.

FIG. 12B is a schematic diagram illustrating reconstructed data according to some embodiments of the present disclosure. Similarly, Coil 1, Coil 2, Coil 3 and Coil 4 may represent a first RF coil, a second RF coil, a third RF coil and a fourth RF coil, respectively, and each RF coil may correspond to a channel. In each channel, black dots (e.g., black dot 1210-2) may each represent a sampled data sample, and grey dots (e.g., grey dot 1230) may each represent a reconstructed data sample. The reconstructed data sample may be generated by one or more methods mentioned in the present disclosure, including but not limited to a compressive sensing method and/or a deep learning method.

Figure 13:
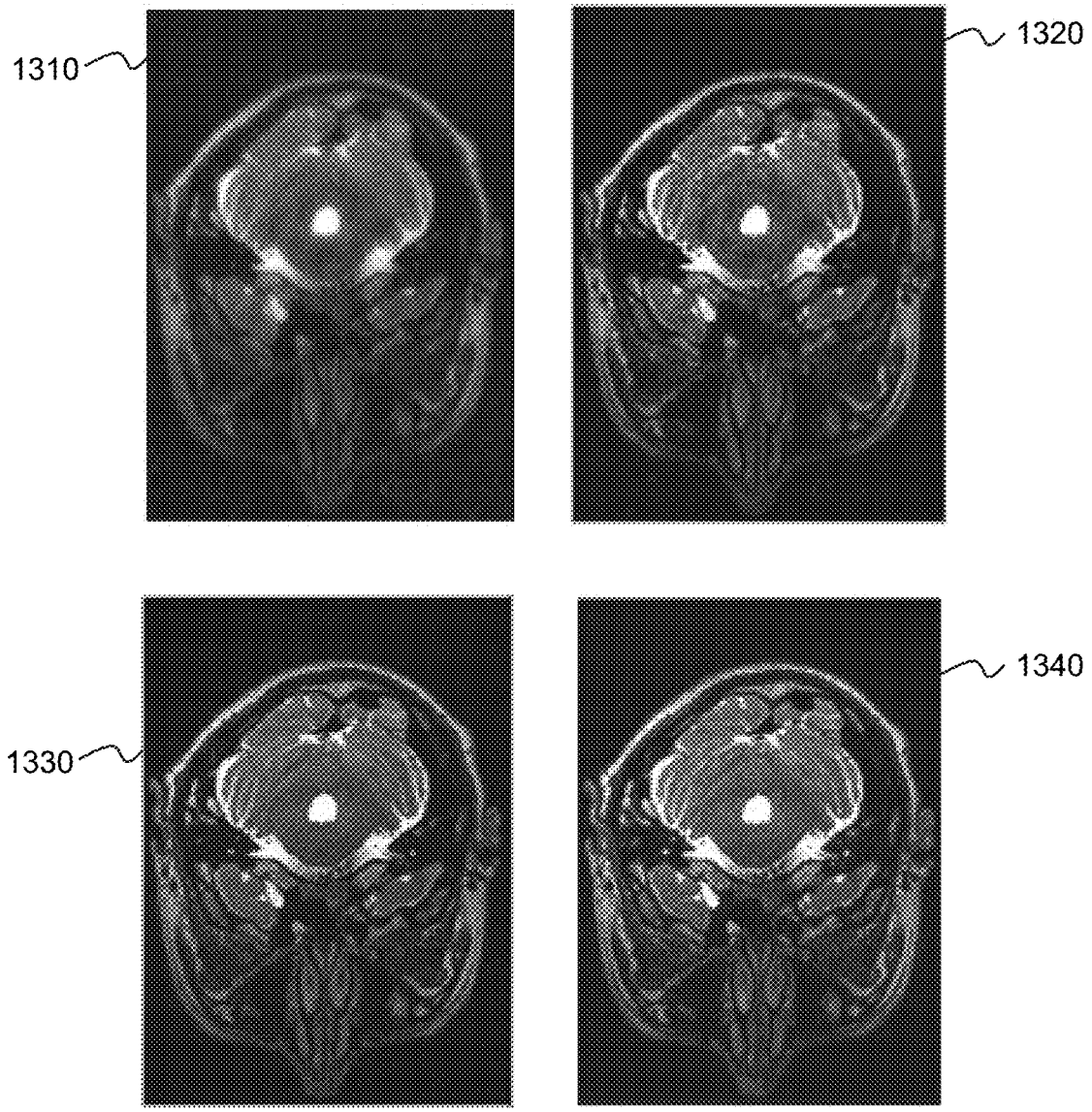
FIG. 13 illustrates exemplary images according to some embodiments of the present disclosure.

FIG. 13 illustrates exemplary images according to some embodiments of the present disclosure. Image 1310 is an image reconstructed directly from undersampled raw data. Image 1320 is an image reconstructed from raw data by a deep learning method as described in the present disclosure. Image 1330 is an image reconstructed by a compressive sensing method as described in the present disclosure. Image 1340 is an image generated by fusing the image 1320 and image 1330 using a fusing method as described in the present disclosure. As illustrated in FIG. 13, the fused image 1340 has a higher contrast, a higher signal to noise ratio (SNR) and a clearer image texture compared with image 1320 and image 1330.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method implemented on at least one device including at least one processor and at least one computer-readable storage medium, the method comprising:
    acquiring raw image data, wherein the raw image data includes a plurality of frequency domain undersampled image data samples;
    generating a first reconstruction result based on the raw image data using a first reconstruction method;
    generating a second reconstruction result based on the raw image data using a second reconstruction method;
    fusing the first reconstruction result and the second reconstruction result; and
    generating a reconstructed image based on a result of the fusion,
    wherein the fusing the first reconstruction result and the second reconstruction result includes:
        decomposing the first reconstruction result into a plurality of first sets;
        decomposing the second reconstruction result into a plurality of second sets, wherein each of the plurality of second sets corresponds to one of the plurality of first sets;
        determining a confidence level relating to a match between each of the plurality of first sets and the corresponding second set; and
        fusing each of the plurality of first sets and the corresponding second set based on the confidence level.

2. The method of claim 1, wherein the determining a confidence level relating to a match between each of the plurality of first sets and the corresponding second set comprises:
    determining a similarity between a grayscale value of each of the plurality of first sets and a grayscale value of the corresponding second set; and
    determining the confidence level based on the similarity.

3. The method of claim 1, wherein the first reconstruction method is compressive sensing method and the second reconstruction method is deep learning method or the first reconstruction method is deep learning method and the second reconstruction method is compressive sensing method.

4. The method of claim 3, further comprising:
    generating a third reconstruction result based on the raw data using a deep learning method; and fusing the first reconstruction result, the second reconstruction result, and the third reconstruction result.

5. The method of claim 1, further comprising:
after fusing the first reconstruction result and the second reconstruction result, determining whether a preset condition is satisfied;
in response to the determination that the preset condition is not satisfied, updating the raw image data based on the result of fusion; and
in response to the determination that the preset condition is satisfied, generating the reconstructed image based on the result of fusion.

6. The method of claim 1, wherein the result of fusion includes frequency domain image data and the generating a reconstructed image based on a result of the fusion comprises transforming the result of fusion including frequency domain image data to obtain the reconstructed image.

7. The method of claim 1, wherein the first reconstruction result includes a first image and the second reconstruction result includes a second image, wherein,
the generating a first reconstruction result based on the raw image data using a first reconstruction method comprises:
reconstructing the first image based on the plurality of frequency domain undersampled image data samples using a compressive sensing method; and
the generating a second reconstruction result based on the raw image data using a second reconstruction method comprises:
reconstructing the second image based on the plurality of frequency domain undersampled image data samples using a deep learning method.

8. The method of claim 1, wherein
the generating a first reconstruction result based on the raw image data using a first reconstruction method comprises:
reconstructing a first image based on the plurality of frequency domain undersampled image data samples using a compressive sensing method; and
transforming the first image to a first set of frequency domain image data to obtain the first reconstruction result; and
the generating a second reconstruction result based on the raw image data using a second reconstruction method comprises:
generating a second set of frequency domain image data based on the raw image data using a deep learning method to obtain the second reconstruction result.

9. A system, comprising:
a storage device storing a set of instructions, and
at least one processor configured to communicate with the storage device, wherein when executing the set of instructions, the at least one processor is configured to cause the system to:
acquire raw image data, wherein the raw image data includes a plurality of frequency domain undersampled image data samples;
generate a first reconstruction result based on the raw image data using a first reconstruction method;
generate a second reconstruction result based on the raw image data using a second reconstruction method;
fuse the first reconstruction result and the second reconstruction result; and
generate a reconstructed image based on a result of the fusion,
wherein to fuse the first reconstruction result and the second reconstruction result, the at least one processor is configured to cause the system to:
decompose the first reconstruction result into a plurality of first sets;
decompose the second reconstruction result into a plurality of second sets, wherein each of the plurality of second sets corresponds to one of the plurality of first sets;
determine a confidence level relating to a match between each of the plurality of first sets and the corresponding second set; and
fuse each of the plurality of first sets and the corresponding second set based on the confidence level.

10. The system of claim 9, wherein to determine a confidence level relating to a match between each of the plurality of first sets and the corresponding second set, the at least one processor is further configured to cause the system to:
determine a similarity between a grayscale value of each of the plurality of first sets and a grayscale value of the corresponding second set; and
determine the confidence level based on the similarity.

11. The system of claim 9, wherein the first reconstruction method is compressive sensing method and the second reconstruction method is deep learning method or the first reconstruction method is deep learning method and the second reconstruction method compressive sensing method.

12. The system of claim 11, wherein the at least one processor is further configured to cause the system to:
generate a third reconstruction result based on the raw data using a deep learning method; and
fuse the first reconstruction result, the second reconstruction result, and the third reconstruction result.

13. The system of claim 9, wherein the at least one processor is further configured to cause the system to:
after fusing the first reconstruction result and the second reconstruction result, determine whether a preset condition is satisfied;
in response to the determination that the preset condition is not satisfied, update the raw image data based on the result of fusion; and
in response to the determination that the preset condition is satisfied, generate the reconstructed image based on the result of fusion.

14. The system of claim 9, wherein the first reconstruction result includes a first image and the second reconstruction result includes a second image, wherein,
to generate a first reconstruction result based on the raw image data using a first reconstruction method, the at least one processor is further configured to cause the system to:
reconstruct the first image based on the plurality of frequency domain undersampled image data samples using a compressive sensing method; and
to generate a second reconstruction result based on the raw image data using a second reconstruction method, the at least one processor is further configured to cause the system to:
reconstruct the first image based on the plurality of frequency domain undersampled image data samples using a compressive sensing method.

15. The system of claim 9, wherein
to generate a first reconstruction result based on the raw image data using a first reconstruction method, the at least one processor is further configured to cause the system to:

reconstruct a first image based on the plurality of frequency domain undersampled image data samples using a compressive sensing method; and transform the first image to a first set of frequency domain image data to obtain the first reconstruction result; and to generate a second reconstruction result based on the raw image data using a second reconstruction method, the at least one processor is further configured to cause the system to:

generate a second set of frequency domain image data based on the raw image data using a deep learning method to obtain the second reconstruction result.

16. A non-transitory computer readable medium, comprising executable instructions that, when executed by at least one processor of an electronic device, directs the at least one processor to perform actions comprising:

acquiring raw image data, wherein the raw image data includes a plurality of frequency domain undersampled image data samples;

generating a first reconstruction result based on the raw image data using a first reconstruction method;

generating a second reconstruction result based on the raw image data using a second reconstruction method;

fusing the first reconstruction result and the second reconstruction result; and generating a reconstructed image based on a result of the fusion, wherein the fusing the first reconstruction result and the second reconstruction result includes:

decomposing the first reconstruction result into a plurality of first sets;

decomposing the second reconstruction result into a plurality of second sets, wherein each of the plurality of second sets corresponds to one of the plurality of first sets;

determining a confidence level relating to a match between each of the plurality of first sets and the corresponding second set; and fusing each of the plurality of first sets and the corresponding second set based on the confidence level.

17. The non-transitory computer readable medium of claim 16, wherein the determining a confidence level relating to a match between each of the plurality of first sets and the corresponding second set further comprises:

determining a similarity between a grayscale value of each of the plurality of first sets and a grayscale value of the corresponding second set; and determining the confidence level based on the similarity.

18. The non-transitory computer readable medium of claim 16, wherein the executable instructions, when executed by the at least one processor of an electronic device, directs the at least one processor to perform actions further comprising:

after fusing the first reconstruction result and the second reconstruction result, determining whether a preset condition is satisfied;

in response to determining that the preset condition is not satisfied, updating the raw image data based on the result of fusion; and in response to determining that the preset condition is satisfied, generating the reconstructed image based on the result of fusion.

19. The non-transitory computer readable medium of claim 16, wherein the first reconstruction result includes a first image and the second reconstruction result includes a second image, and wherein the generating a first reconstruction result based on the raw image data using a first reconstruction method comprises:

reconstructing the first image based on the plurality of frequency domain undersampled image data samples using a compressive sensing method; and the generating a second reconstruction result based on the raw image data using a second reconstruction method comprises:

transforming the raw image data to frequency domain image data; and reconstructing the second image based on the plurality of frequency domain undersampled image data samples using a deep learning method.

20. The non-transitory computer readable medium of claim 16, wherein the generating a first reconstruction result based on the raw image data using a first reconstruction method comprises:

reconstructing a first image based on the plurality of frequency domain undersampled image data samples using a compressive sensing method; and transforming the first image to a first set of frequency domain image data to obtain the first reconstruction result; and the generating a second reconstruction result based on the raw image data using a second reconstruction method comprises:

generating a second set of frequency domain image data based on the raw image data using a deep learning method to obtain the second reconstruction result.

* * * * *